United States Patent [19]
Poetsch

[11] 4,245,235
[45] Jan. 13, 1981

[54] METHOD AND SYSTEM FOR TRANSMITTING AND/OR RECORDING COLOR T.V. SIGNALS

[75] Inventor: Dieter Poetsch, Ober Ramstadt, Fed. Rep. of Germany

[73] Assignee: Robert Bosch GmbH, Stuttgart, Fed. Rep. of Germany

[21] Appl. No.: 810,961

[22] Filed: Jun. 29, 1977

[30] Foreign Application Priority Data

Jul. 2, 1976 [DE] Fed. Rep. of Germany ....... 2629706

[51] Int. Cl.³ .......................... H04N 9/40; H04N 5/04
[52] U.S. Cl. ...................................... 358/14; 358/148
[58] Field of Search .................. 358/12, 17, 147, 141, 358/148, 4

[56] References Cited
U.S. PATENT DOCUMENTS

| | | | |
|---|---|---|---|
| 3,548,091 | 12/1970 | Bockwoldt | 358/17 |
| 3,781,463 | 12/1973 | Van den Bussche | 358/12 |
| 4,122,477 | 10/1978 | Gallo | 358/4 |

FOREIGN PATENT DOCUMENTS

| | | | |
|---|---|---|---|
| 2348291 | 4/1975 | Fed. Rep. of Germany | 358/12 |
| 1111628 | 3/1956 | France | 358/14 |

*Primary Examiner*—Terrell W. Fears
*Assistant Examiner*—Aristotelis M. Psitos
*Attorney, Agent, or Firm*—Michael J. Striker

[57] ABSTRACT

Color T.V. signals are transmitted from a transmitter to a receiver or from a color T.V. camera into a transmitter, or the like, in analog form. The luminance information is transmitted throughout approximately 80% of the horizontal line period. During the major portion of the remainder of each of the horizontal line periods, the color information is transmitted in time-compressed and time-division-multiplexed form.

14 Claims, 5 Drawing Figures

| 316 | ————————————— | B-Y |
| 4 | ————————————— | (R-Y) |
| 317 | ————————————— | (R-Y) |
| 5 | ————————————— | (B-Y) |
| 318 | ————————————— | (B-Y) |
| 6 | ————————————— | (R-Y) |
| 318 | ————————————— | (R-Y) |

METHOD AND SYSTEM FOR TRANSMITTING AND/OR RECORDING COLOR T.V. SIGNALS

BACKGROUND OF THE INVENTION

German allowed patent application DT-AS No. 2,056,684 discloses a system for storing color T.V. signals in which the color information is recorded during the back porches of the T.V. signal. This known system is predicated upon a prolongation of the flyback time interval, leading to a shortening of the useful part of the horizontal line interval. With this known system, the color information is time-compressed by a factor of about 5.

SUMMARY OF THE INVENTION

It is a general object of the invention to provide a method and system of the general type in question in which the time intervals for transmission of luminance information need not be shortened.

According to one concept of the invention, during the transmission and/or recording of color information, time-division-multiplexed color-difference signals are processed, and a blanking-level signal is transmitted during time intervals which are small relative to the intervals during which the color-difference signals are transmitted. Preferably, the amplitude of the blanking-level signal corresponds to the hueless-value amplitude of the color-difference signals. As a result, amplitude errors, although they produce color saturation errors, do not produce color hue errors.

According to an advantageous concept of the invention, the blanking-level signal and a synchronization pulse are transmitted in alternate horizontal line intervals. This assures sufficient synchronization. Furthermore, this synchronizing pulse, transmitted in every second horizontal line interval, can be used, during reproduction or for decoding by a receiver, to synchronize the operation of a changeover switch used for processing the signals in question.

Noise and interference resulting from phase modulation of subcarriers in the conventional NTSC and PAL systems can be avoided with the present invention. Additionally, bandwidth limitations of the transmission channel or recording device employed with the inventive method and system have equal effects upon the luminance information and the brightness information. This assures relatively high color-image quality, even when bandwidth is very limited.

In accordance with the present invention, it is preferred that the luminance information not be time-compressed, but limited time-compression could be resorted to, e.g., with a compression factor as small as 1 to 1.1.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
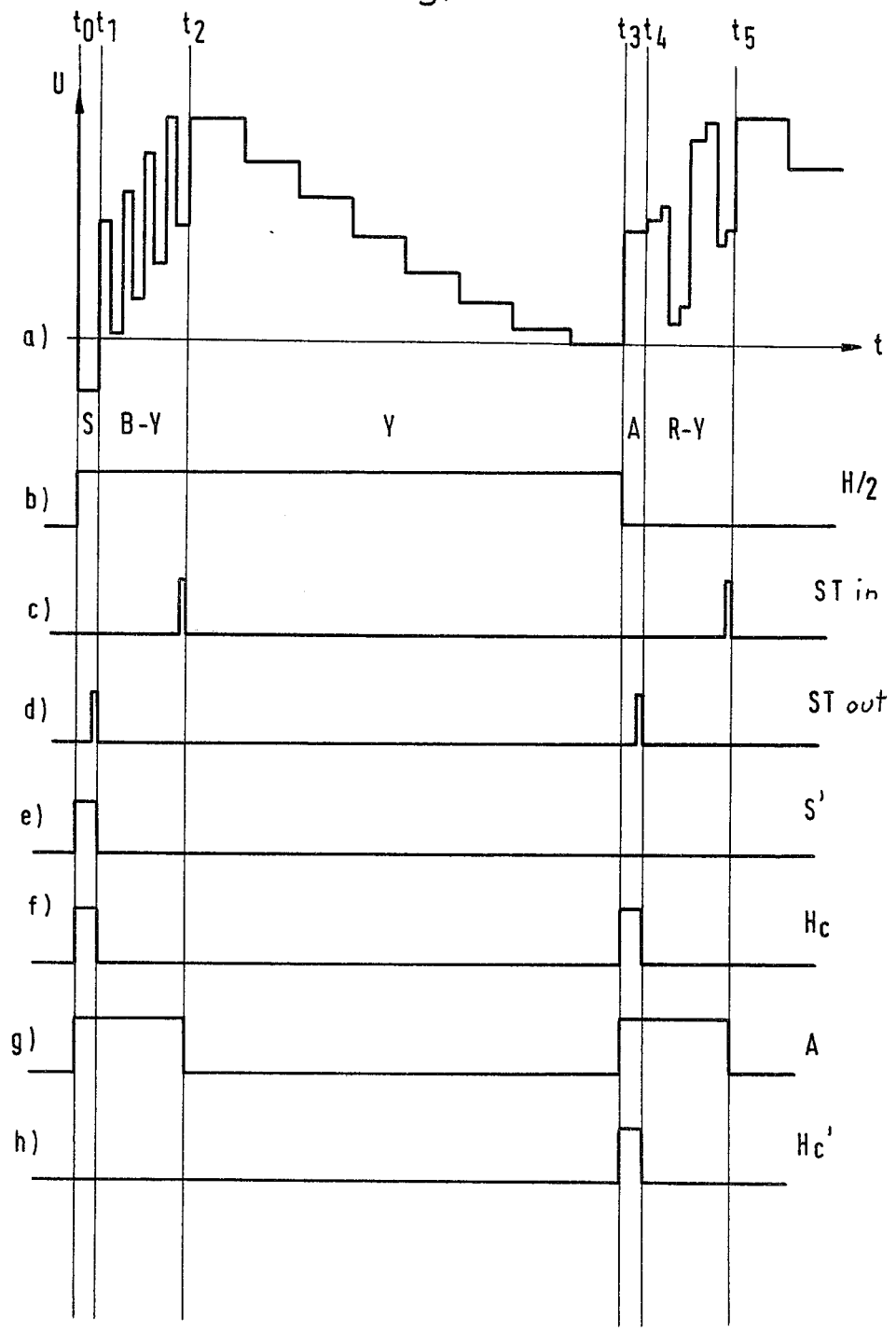
FIG. 1 is a voltage-versus-time diagram depicting various signals and control pulses referred to in the explanation of preferred embodiments.

The voltage-versus-time diagram of FIG. 1 is based upon a color-bar test pattern. The time intervals between $t_0$ and $t_2$, and $t_3$ and $t_5$, correspond approximately to the horizontal blanking interval of a conventional color T.V. signal. During the time from $t_2$ to $t_3$, the luminance signal Y is transmitted, as in conventional color T.V. signal transmission. This assures that, when the inventive method is employed, it is not necessary to resort to expensive coding and decoding expedients in the transmission or recording of the luminance signals; furthermore, the deterioration of quality of the luminance signal which could result is avoided.

As shown in FIG. 1, the color information is transmitted during the major part of the horizontal blanking interval. Specifically, the color-difference signal B-Y is transmitted during the interval from $t_1$ to $t_2$, and the color-difference signal R-Y during the interval from $t_4$ to $t_5$.

As great a fraction of the horizontal blanking interval as possible should be utilized for the transmission of the color-difference signals. Accordingly, there is left over for the synch pulse and the blanking-level signal only relatively little time. Therefore, according to a further concept of the invention, during one horizontal line interval the synch pulse is transmitted, and during the next horizontal line interval the blanking-level signal is transmitted. In correspondence thereto, FIG. 1 depicts in the interval between $t_0$ and $t_1$ a synch pulse S whose amplitude is outside the amplitude range of picture information, so that the synch pulse can be readily separated out by means of conventional circuits. The blanking-level signal A is transmitted during the next-following horizontal line interval, during the time from $t_3$ to $t_4$. When color-difference signals are employed, the amplitude of the blanking-level signal preferably corresponds to the hueless value, which is located at about 50% of the amplitude range for picture information.

Figure 2:
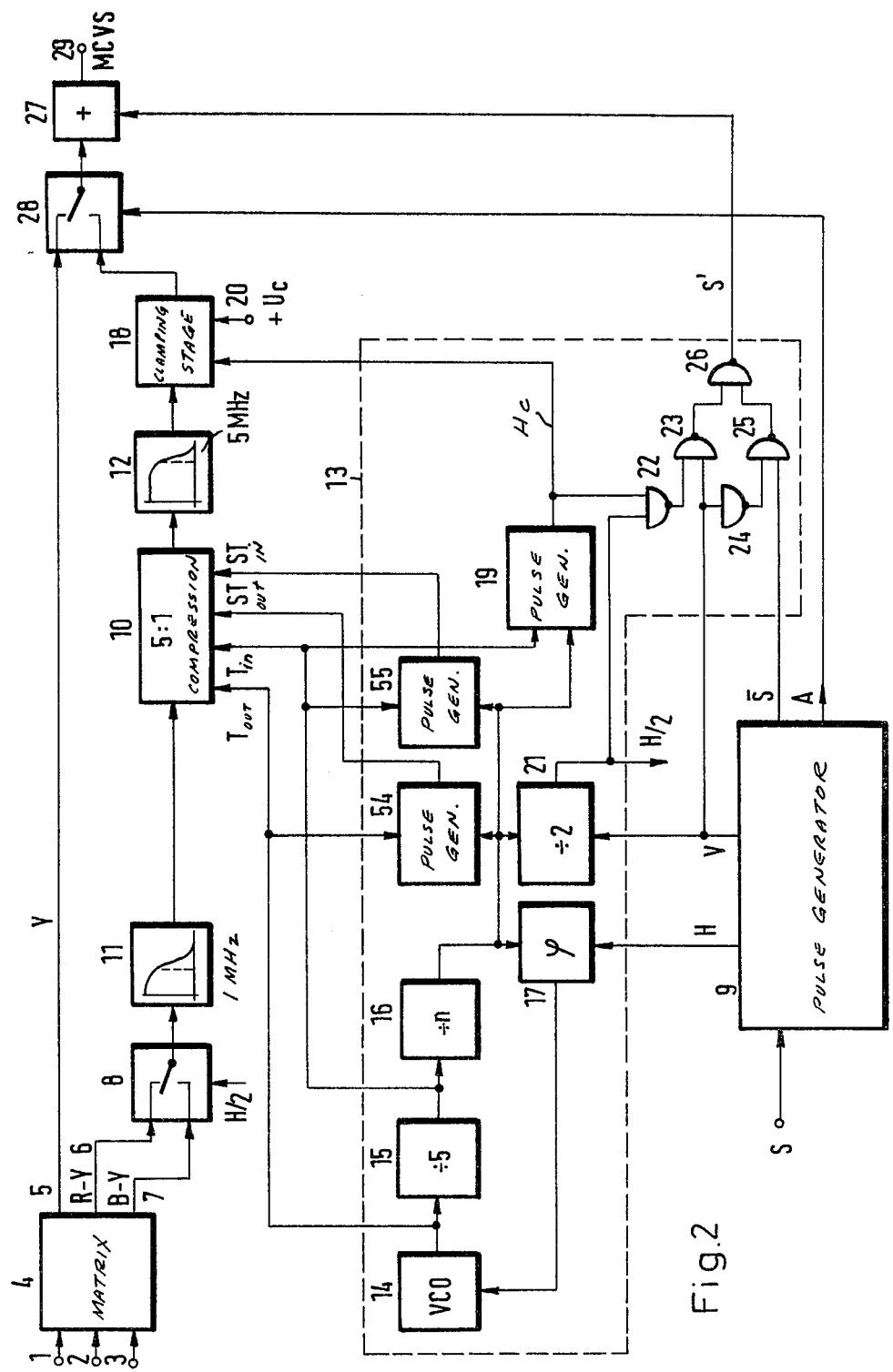
FIG. 2 is a schematic block diagram of an encoder for converting a three-channel color T.V. signal into a single-channel signal.

FIG. 2 is a schematic block circuit diagram of an encoder for deriving the signals graphed in FIG. 1. The inputs 1, 2, 3 of a conventional matrix circuit 4 receive the color signals R, B, G. The matrix circuit 4 furnishes at its outputs 5, 6, 7 the luminance signal Y and the color-difference signals R-Y and B-Y.

The color-difference signals are transmitted to an electronic changeover switch 8. The latter is controlled by a train of rectangular pulses whose pulse-repetition frequency is equal to one half the line frequency, so that the R-Y and B-Y difference signals are transmitted during alternate horizontal line intervals. The control pulses for changeover switch 8 are supplied by a pulse generator 9, operative for receiving a conventional S (synch) signal and deriving therefrom the convention H (horizontal synch), A (blanking level) and V (vertical synch) pulses of color T.V. signals. The generation of these pulses is performed by circuits conventional in the color-T.V. art and need not be discussed in greater detail here.

The half-line-frequency control pulses for the changeover switch 8 are depicted in line b of FIG. 1. The color-difference signals are furnished at the output of changeover switch 8 in time-division-multiplexed form. They are then applied to a compression circuit 10 and are time-compressed. Compression circuits are conventional per se and include, for example, bucket-brigade storages, charge-coupled storages, series-analog storages, or the like.

Compression circuits store instantaneous values of their input signal, sampled at discrete sampling moments. Accordingly, control of the operation of a compression circuit requires consideration of the sampling theorem. Specifically, both the writing-in into and the read-out from the compression circuit must be effected using a train of write-in pulses or a train of read-out pulses (as the case may be) whose pulse-repetition frequency is at least twice that of the highest-frequency component of the signal to be time-compressed. This is assured for write-in if one employs a train of write-in pulses whose pulse-repetition frequency is for example 2.5 MHz, in which case the frequency of the read-out pulses (for a compression factor of 5) will be 12.5 MHz. To avoid interference effects, a low-pass filter having a cut-off frequency of 1 MHz is connected to the input of the compression circuit 10, and a low-pass filter with a 5 MHz cut-off frequency is connected to the output thereof.

The pulses required for control of the time-compression operation are produced within the clocking circuit 13 (shown enclosed in broken lines in FIG. 2). The read-out clock frequency (the pulse-repetition frequency for the train of read-out control pulses) is produced within a voltage-controlled oscillator 14 whose frequency is divided by five, to produce at the output of frequency divider 15 the requisite write-in pulses. A further frequency divider 16 produces at its output a train of pulses whose pulse-repetition frequency is equal to the horizontal line frequency. The phase angle of this pulse train is compared against that of the horizontal synch pulses H produced in circuit 9 from the S signal, by means of a phase comparator 17. The output voltage of phase comparator 17 is applied to the control input of voltage-controlled oscillator 14, for frequency adjustment control. The clock pulses $T_{in}$ and $T_{out}$ (i.e., the write-in control pulse train and the read-out control pulse train) are always being applied to the respective control inputs of compression circuit 10. However, write-in and read-out actually begin only when the compression circuit 10 also receives one of the start pulses $ST_{in}$ (for write-in) or $ST_{out}$ (for read-out). The latter are generated by logical combination of the clock pulses ($T_{in}$ or $T_{out}$) and the horizontal-line-frequency pulses. The start pulses $ST_{in}$ and $ST_{out}$ are depicted in lines c and d of FIG. 1, respectively.

The time-compressed color-difference signals are applied to a clamping stage 18. The clamping is performed during the time intervals $t_0$ to $t_1$ and $t_3$ to $t_4$. The pulses $H_c$ required for the control of the clamping stage 18 are generated in the pulse generator 19 by logical combination of the H pulses with write-in control pulses $T_{in}$.

The clamping voltage is applied to clamping stage 18 at 20, and preferably amounts to $U_c = 50\%$ of the amplitude range of the luminance signal.

To avoid interference effects, it is advantageous to synchronize the switchover phase of changeover switch 8 with the vertical synch pulse V. If this is done, then in successive frames (field pairs), the same color-difference signals are transmitted in the same respective line pairs. To this end, circuit 21 logically combines the V pulse with the H pulse. This can be done using the circuit shown in FIG. 3, in which case the $H_1$ pulse is applied to the so-called trigger input of a JK flip-flop, whereas the V pulse is applied to the reset input R thereof. As a result, Q furnishes a rectangular pulse train which has one half the horizontal line frequency as shown in line b of FIG. 1.

Figures 3, 4:
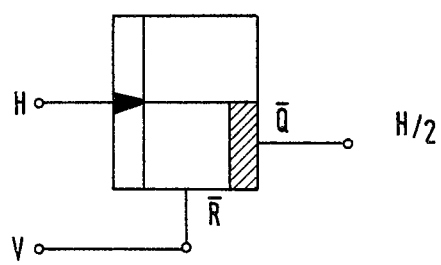
FIG. 3 depicts details of one component of the decoder.
FIG. 4 depicts graphically the result produced by the circuit component shown in FIG. 3.

FIG. 4 schematically depicts several lines 316, 317, etc., of a first field (half image) and several lines 4, 5 etc., of a second field (half image). By means of the aforedescribed synchronization of the changeover switch 8, the coordination of the color-difference signals as shown in FIG. 4 is repeated in each successive frame.

According to one concept of the invention, the synchronizing pulse is to be transmitted during only every second horizontal line interval. To this end the pulse $H_c$ shown in line f of FIG. 1 is logically combined with the output voltage of circuit 21 shown in line b of FIG. 1, to form the pulse S' shown in line e of FIG. 1. Use is made of a logic circuitry 22–26. In particular, it has proved advantageous to transmit the normal synch signal during the vertical blanking interval. To this end, the pulse at the output of NAND-gate 22 is logically combined with the pulses V and S by means of logic circuitry 23–26 and added onto the signal to be transmitted or recorded by means of the addition stage 27.

The electronic changeover switch 28 is controlled by means of an A pulse, corresponding to the conventional horizontal blanking pulse of color television, in such a manner that, during the conventional horizontal sweep interval, output 5 of matrix 4 is connected to the addition stage 27 and, during the horizontal blanking interval, the clamping stage 18 is connected to the addition stage 27.

The signal furnished at output 29 of the encoder in FIG. 2 is depicted in line a of FIG. 1.

Figure 5:
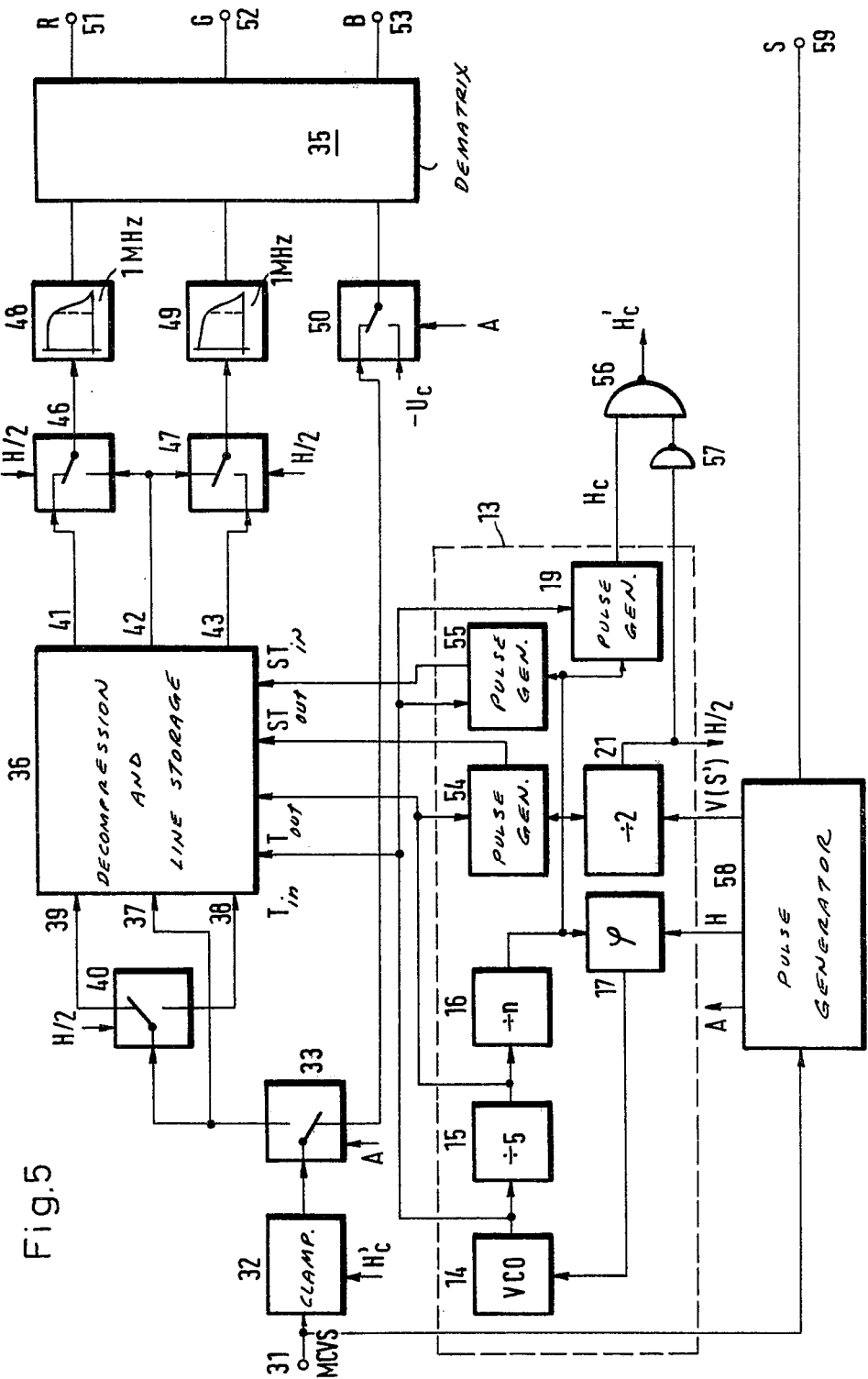
FIG. 5 is a schematic block diagram of a decoder for reconverting the single-channel signal into a three-channel color T.V. signal.

FIG. 5 depicts a decoder for decoding the time-division-multiplexed color T.V. signals. The signals (received from a transmitter or reproduced off a recording medium) are applied to decoder input 31. They pass through a clamping stage 32 to a changeover switch 33. Clamping stage 32 serves to restore the D.C. level of the signal and is controlled by the $H_c'$ pulses shown in line h of FIG. 1.

Changeover switch 33 is controlled by the pulses A (line g of FIG. 1) in such a manner that it is in its illustrated setting during the horizontal sweep interval, so that the luminance signal Y can be transmitted directly to input 34 of dematrix 35. During the horizontal blanking interval, the switch 33 is in its upper setting. Storage and decompression circuit 36 serves to store and decompress each color-difference signal over one respective horizontal line interval. Like circuit 10 of the encoder, it can be comprised of bucket-brigade storages, etc. A storage and decompression circuit particularly well suited, and preferred, for circuit 36 is disclosed in my copending application Ser. No. 810,960, entitled "SYSTEM AND METHOD FOR DECODING TIME-DIVISION-MULTIPLEXED COLOR T.V. SIGNALS", filed on the same day as the present application, the disclosure of which is incorporated herein by reference. The storage and decompression circuit 36 has three inputs 37, 38, 39. Input 37 receives, alternately, one and then the other of the two color-difference signals B-Y and R-Y. Input 38 receives only the difference signal R-Y. Input 39 receives only the difference signal B-Y. To route the color-difference signals to the two inputs 38, 39, use is made of an electronic changeover switch 40 controlled by H/2 pulses such as shown in line b of FIG. 1.

Storage and decompression circuit 36 furnishes the two decompressed color-difference signals on its three outputs 41, 42, 43. Specifically, there appear on output 42 first the one color-difference signal and then the other, in alternation. When one color-difference signal appears on output 42, the other color-difference signal appears on one or the other of the two remaining outputs 41 and 43.

In order to transmit corresponding pairs of color-difference signals to the inputs 44 and 45 of dematrix 35 with their original simultaneity restored, use is made of two electronic changeover switches 46, 47, which are likewise controlled by H/2 pulses. The timing of changeover switches 46, 47 is explained in greater detail in my simultaneously filed copending application, identified earlier.

Additionally, low-pass filters 48, 49 having a 1 MHz cutoff frequency, are connected to the outputs of the changeover switches 46, 47, to suppress higher-frequency noise generated during the sampling of the instantaneous values of the color-difference signals in circuit 36.

Accordingly, the outputs 51, 52, 53 of the dematrix 35 furnish the primary color signals R, G and B. The generation of clock pulses in the decoder is performed in the same manner as in the encoder. Circuit 13 in the decoder of FIG. 5 corresponds to circuit 13 in the encoder of FIG. 2, and so its components are denoted by the same reference numerals as in FIG. 2. However, it is to be understood that the frequencies of the write-in and read-out pulses of FIG. 2 are reversed in FIG. 5, i.e., to effect in FIG. 5 a time-decompression corresponding to the time-compression effected in FIG. 2. Additionally, the output pulses $H_c$ are logically combined with H/2 pulses in such a manner that, instead of the pulses S' generated in the circuit of FIG. 2 and shown in line f of FIG. 1, there are generated in the decoder of FIG. 5 the pulses $H_c'$ shown in line h of FIG. 1. This is accomplished by logic gates 56 and 57.

Using the same circuit configuration for generating the clock pulses in both the decoder and the encoder yields the advantage that, any non-linearities with respect to time which may be introduced during signal compression are inherently compensated during signal decompression.

In the decoder of FIG. 5, the pulse generating circuit 58 likewise corresponds to the pulse generating circuit 9 in the encoder of FIG. 2. However, in contrast to the pulse generating circuit of the encoder, it is not synchronized with the conventional synchronizing signal, but instead is synchronized with the signal S' contained in the transmitted signal during each second horizontal line interval. To this end, use can be made of a conventional flywheel synchronizer circuit. It has been found that conventional phase comparison circuits, with no modifications or at most minor modifications, can also be employed satisfactorily, if a synchronization pulse appears in only every second horizontal line interval. The S' pulse is, by means of a conventional amplitude filter, separated out from the transmitted time-division-multiplexed signal, along with the conventional vertical-blanking synch signal.

Finally, by means conventional in the color-T.V. art, a normal synchronization signal S is derived with circuit 58 and made available at output 59 together with the color signals at dematrix outputs 51, 52, 53.

The decoder outputs 51, 52, 53 and 59 can, for example, be connected to the inputs of a conventional encoder for production of a conventional NTSC, PAL or SECAM color T.V. signal.

In clamping stage 32, incoming signals are clamped in such a manner that, the signal level during the time interval from $t_3$ to $t_4$ (see FIG. 1) corresponds to ground potential. At the output side of changeover switch 33, this level is established for the luminance signal during the entire horizontal blanking interval. However, in order to maintain in the luminance signal a normal blanking level for black, use is made of a changeover switch 50 which assumes its lower setting during the horizontal blanking interval. Applied to the corresponding input is a voltage $-U_c$ which—ignoring polarity—corresponds to the voltage $U_c$ applied to the clamping stage 18 (FIG. 2).

As already mentioned, during signal compression non-linearities with respect to time may be introduced, particularly inasmuch as the voltage-controlled oscillator 14 during each horizontal line interval may undergo frequency changes. As likewise mentioned already, it is therefore to be recommended to use identical circuit configurations for the circuits which generate the clock pulses (write-in and read-out pulse trains) for compression and decompression. To the extent that spatial requirements permit, it is advantageous to provide a single clock pulse generating circuit which selectably generates clock pulses for both compression and decompression; this is, for example, a possibility for the recording and subsequent reproduction of color T.V. signals, i.e., with the color-difference signals being time-compressed prior to recording and then time-decompressed for reproduction.

To optimally utilize the amplitude range available during transmission of color-difference signals, it is recommended that one so select the coefficients of matrix 4 (FIG. 2) that the amplitudes of the color-difference signals for normal color-bars—i.e., the maximum amplitudes—have equal values.

Effecting the clock pulse generation by means of the controlled oscillator, the frequency dividers and the phase comparisons—i.e., in accordance with the flywheel synchronization principle—, one achieves the advantage that the synchronizing pulses and the write-in and read-out pulses are matched in phase shift to the H pulses too, if during reproduction of recorded signals time-base errors appear leading to fluctuations in the horizontal line period. Accordingly, color registration between the color signals and the luminance signal is maintained.

The phase synchronization of the H/2 pulses in the decoder can be performed, on the one hand, as in the encoder using the V pulse and, on the other hand, using the S' pulses which appear in every second horizontal line interval and are associated with one of the color-difference signals. Lastly, instead of V pulses, S' pulses can be applied to the circuit 21.

In the embodiments described above, two color-difference signals are transmitted in alternation, i.e., time-compressed and time-division-multiplexed in alternate horizontal line intervals, and the luminance signal is transmitted without time compression during the active part (sweep interval) of the horizontal line interval. However, the inventive concepts are likewise applicable to the transmission of primary color signals R, B and G. In that event, for example, the G signal (in correspondence to the luminance signal Y in the illustrative embodiments) would be transmitted without time-compression during the sweep period of every horizontal line interval, in which case the R and B signals would be transmitted in alternation in time-compressed form, time-division-multiplexed in alternate horizontal line intervals (in correspondence to the color-difference signals R-Y and B-Y in the illustrative embodiments.) In that event, the amplitude of the blanking-level signal (A in the illustrative embodiments) would correspond to the black-level amplitude value of the primary color signals, i.e., instead of corresponding to the huelessvalue amplitude level of the color-difference signals.

It will be understood that each of the elements described above, or two or more together, may also find a useful application in other types of circuits and procedural steps differing from the types described above.

While the invention has been illustrated and described as embodied in the encoding and decoding of time-compressed color-difference signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method of transmitting color T.V. signals in analog form from a receiver into a recorder, from a transmitter to a receiver, from a color T.V. camera into a transmitter, or the like, the steps of transmitting the luminance information throughout approximately 80% of the horizontal line period, transmitting the color information in time-compressed and time-division-multiplexed form throughout the major portion of the remainder of the horizontal line period, and further transmitting a synchronizing pulse during alternate horizontal line intervals and a blanking-level signal during alternate horizontal line intervals, the line intervals during which the synchronizing pulse is transmitted alternating with those in which the blanking-level signal is transmitted.

2. In a method as defined in claim 1, the transmitting of the color information comprising transmitting time-compressed color-difference signals time-division-multiplexed in different respective horizontal line periods, and transmitting the blanking-level signal during time intervals whose duration is smaller than that of the time intervals in which the color-difference signals are transmitted, the blanking-level signal having an amplitude approximately equal to the hueless-value amplitude of the color-difference signals.

3. In a method as defined in claim 2, the transmitting of the synchronizing pulse being performed only during those horizontal line intervals in which a predetermined one of the color-difference signals is being transmitted.

4. In a method as defined in claim 2, transmitting the color-difference signals with such respective amplitude ranges that the amplitudes of the color-difference signals are equal for normal color bars.

5. In a method as defined in claim 1, the transmitting of the color information comprising transmitting primary color value signals time-division multiplexed in different respective horizontal line intervals, and transmitting the blanking-level signal during time intervals whose duration is smaller than the time intervals in which said primary color value signals are transmitted, the blanking-level signal having an amplitude approximately equal to the black-level amplitude of the primary color value signals.

6. In a method as defined in claim 1, the transmitting of the color information comprising transmitting primary color value signals time-division-multiplexed in different respective horizontal line intervals, the synchronizing pulse being transmitted only during those horizontal line intervals in which a predetermined one of the primary color value signals is being transmitted.

7. In a method as defined in claim 1, further transmitting during the vertical blanking interval a synchronizing signal of one of the conventional color T.V. systems (NTSC, SECAM, PAL).

8. In a method as defined in claim 1, transmitting the color information signals in time-compressed form compressed by a factor of about 5.

9. In a method as defined in claim 1, the color information including a plurality of time-compressed and time-division-multiplexed color information signals, further counteracting the possibility of color flicker at the color edges of the ultimate image by transmitting one color information signal in a sequence of horizontal line intervals and another color information signal in a second sequence of horizontal line intervals interleaved with the first in such a manner that during pairs of horizontal line intervals corresponding to adjoining picture lines of a frame the same color information signal is being transmitted.

10. In a system for transmitting color T.V. signals in analog form from a receiver into a recorder, from a transmitter to a receiver, from a color T.V. camera into a transmitter, or the like, in combination, means for transmitting the luminance information throughout approximately 80% of the horizontal line period; means for processing synchronizing pulses during alternate horizontal line intervals and blanking-level signals in alternate horizontal line intervals which alternate with those of the synchronizing pulses; and means for processing the color information signals in time-compressed and time-division-multiplexed form throughout the major portion of the remainder of the horizontal line period, including storage means for storing color information signals, means for applying color information signals to the storage means, means for generating and applying trains of write-in and read-out control pulses to the storage means, the pulse repetition frequency of the write-in control pulse train being different from that of the read-out control pulse train, whereby the written-in and read-out color information signals will differ by a time-compression factor, the means for generating and applying the trains of write-in and read-out control pulses including controllable-frequency oscillator means operative for producing pulses at a frequency equal to a multiple of the horizontal line frequency, frequency divider means for deriving from the oscillator means a pulse train of lower frequency, means for furnishing a reference pulse train having a frequency equal to the horizontal line frequency, and phase comparing means operative for receiving the pulse train from the frequency divider means and also the reference pulse train, comparing the two and in dependence upon the comparison automatically adjusting the frequency of the oscillator to effect phase shift regulation.

11. In a system as defined in claim 10, the storage means comprising a time-compression storage means and a time-decompression storage means, the means for applying color information signals comprising means for applying uncompressed color information signals to the time-compression storage means and for applying time-compressed color information signals from the time-compression storage means to the time-decompression storage means, the means for generating and applying trains of write-in and read-out control pulses comprising first control means for generating and applying write-in and read-out control pulses to the time-compression storage means and second control means for generating and applying write-in and read-out control pulses to the time-decompression storage means, the oscillator means comprising first and second oscillator means respectively forming parts of the first and second control means, the frequency divider means comprising first and second frequency divider means respectively forming parts of the first and second control means, the reference pulse train furnishing means comprising first and second reference pulse train furnishing means respectively forming parts of the first and second control means, the phase comparing means comprising first and second phase comparing means respectively forming parts of the first and second control means.

12. In a system as defined in claim 10, the means for generating and applying trains of write-in and read-out control pulses comprising means for generating a write-in control pulse train of lower frequency than the read-out control pulse train and also a write-in control pulse train of higher frequency than the read-out control pulse train, whereby to effect time-compression or time-decompression.

13. In a system as defined in claim 10, the means for processing the color information signals comprising means for processing first and second time-compressed and time-division-multiplexed color information signals in respective first and second horizontal line intervals so interleaved that during pairs of horizontal line intervals corresponding to adjoining picture lines of a frame the same color information signal is being processed during both horizontal line intervals of the pair and comprising changeover switch means for routing the first and second color information signals through respective ones of two branches of a transmission path, and means operative for controlling the operation of the changeover switch means by applying thereto a control pulse train of one half the horizontal line frequency, and means operative for receiving vertical synch pulses and in dependence thereon automatically adjusting the phase of the half-line-frequency control pulse train.

14. In a method of transmitting color T.V. signals in analog form from a receiver into a recorder, from a transmitter to a receiver, from a color T.V. camera into a transmitter, or the like, the step of transmitting a synchronizing pulse during alternate horizontal line intervals and a blanking-level signal during alternate horizontal line intervals, the line intervals during which the synchronizing pulse is transmitted alternating with those in which the blanking-level signal is transmitted.

* * * * *